UNITED STATES PATENT OFFICE.

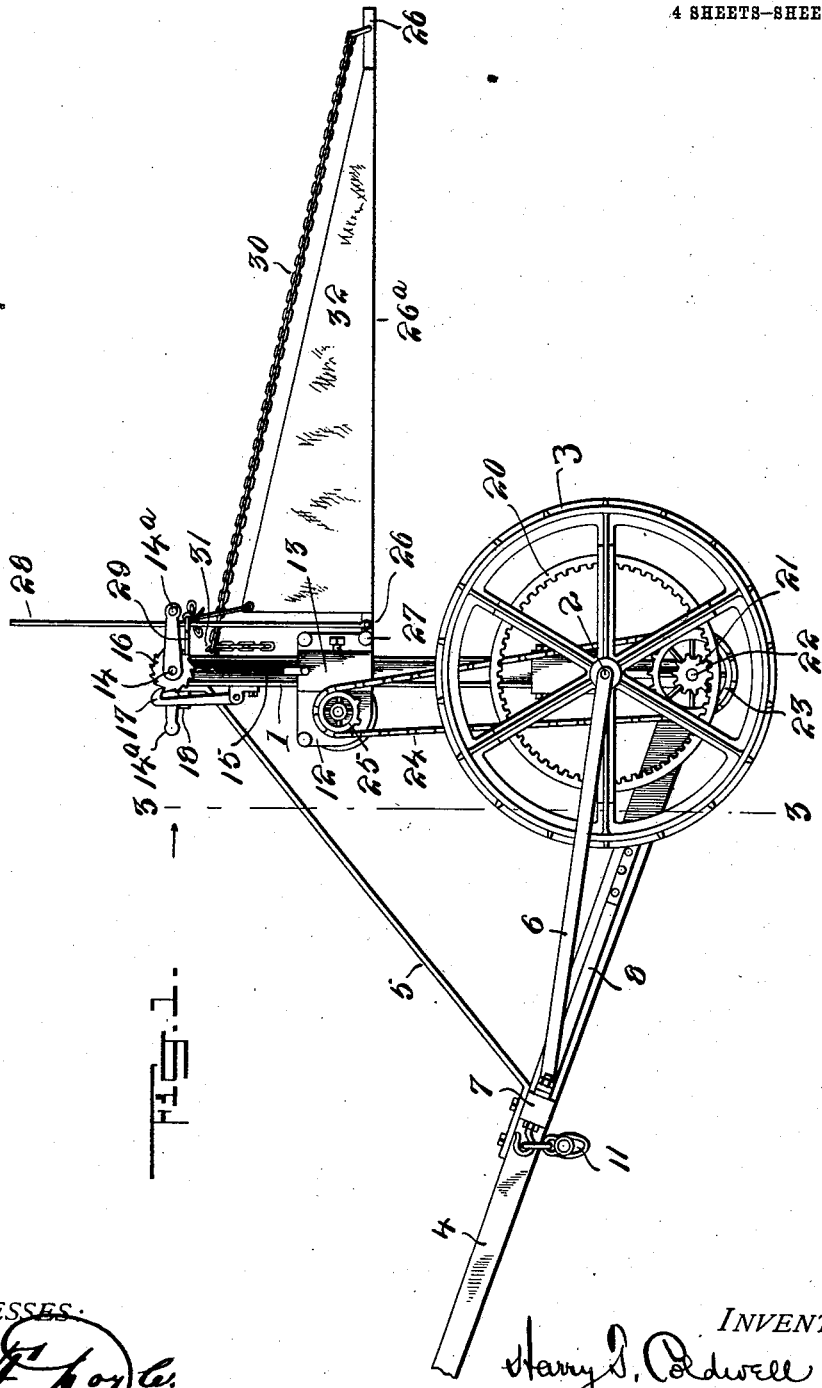

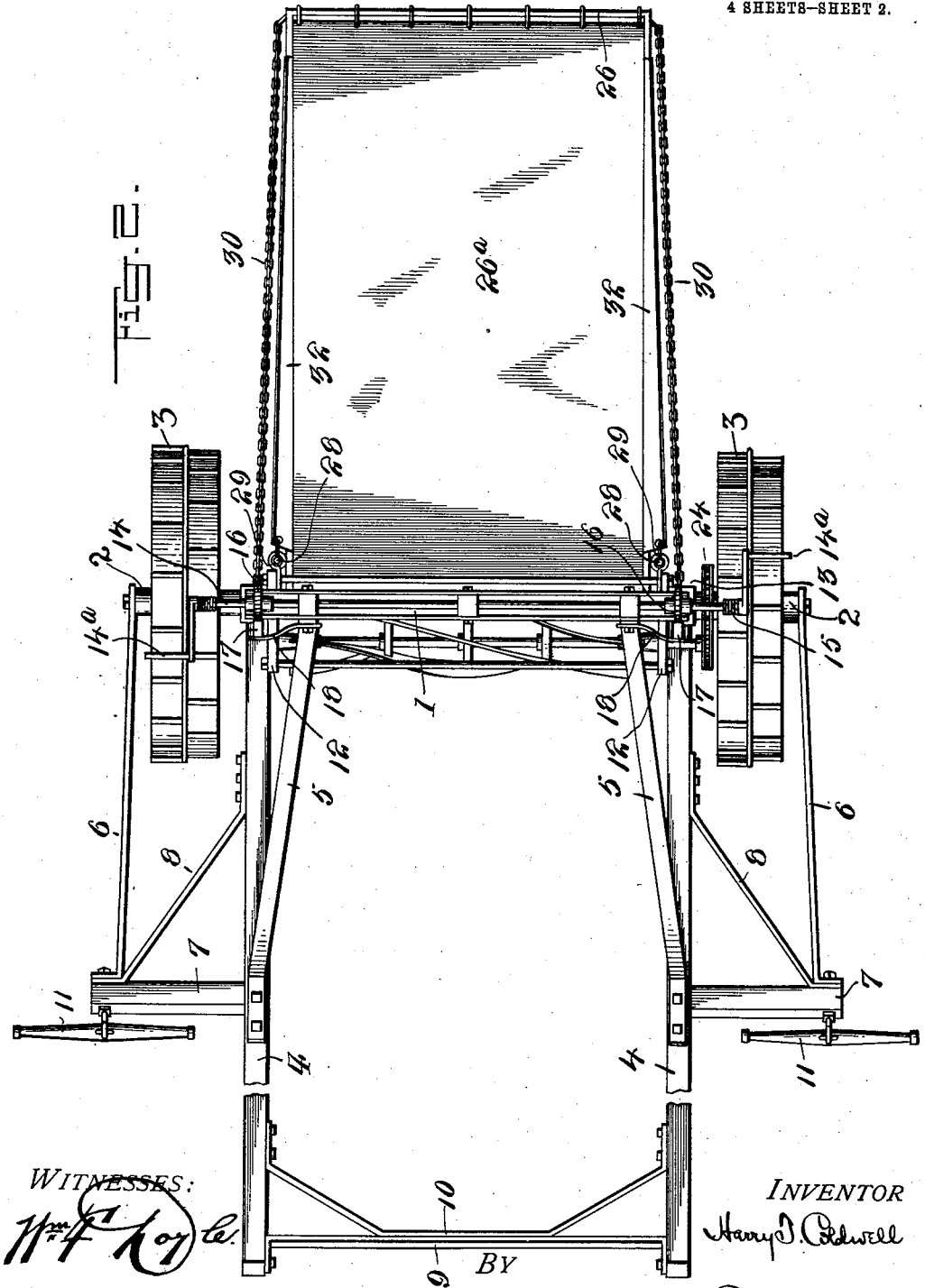

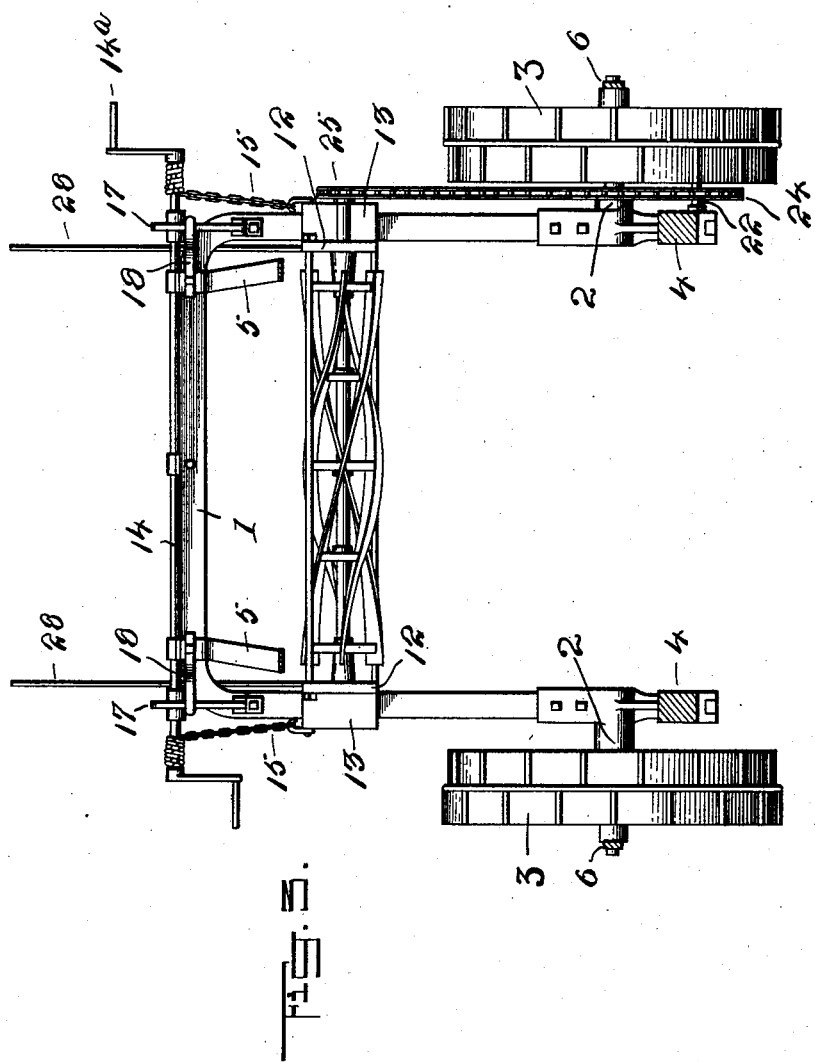

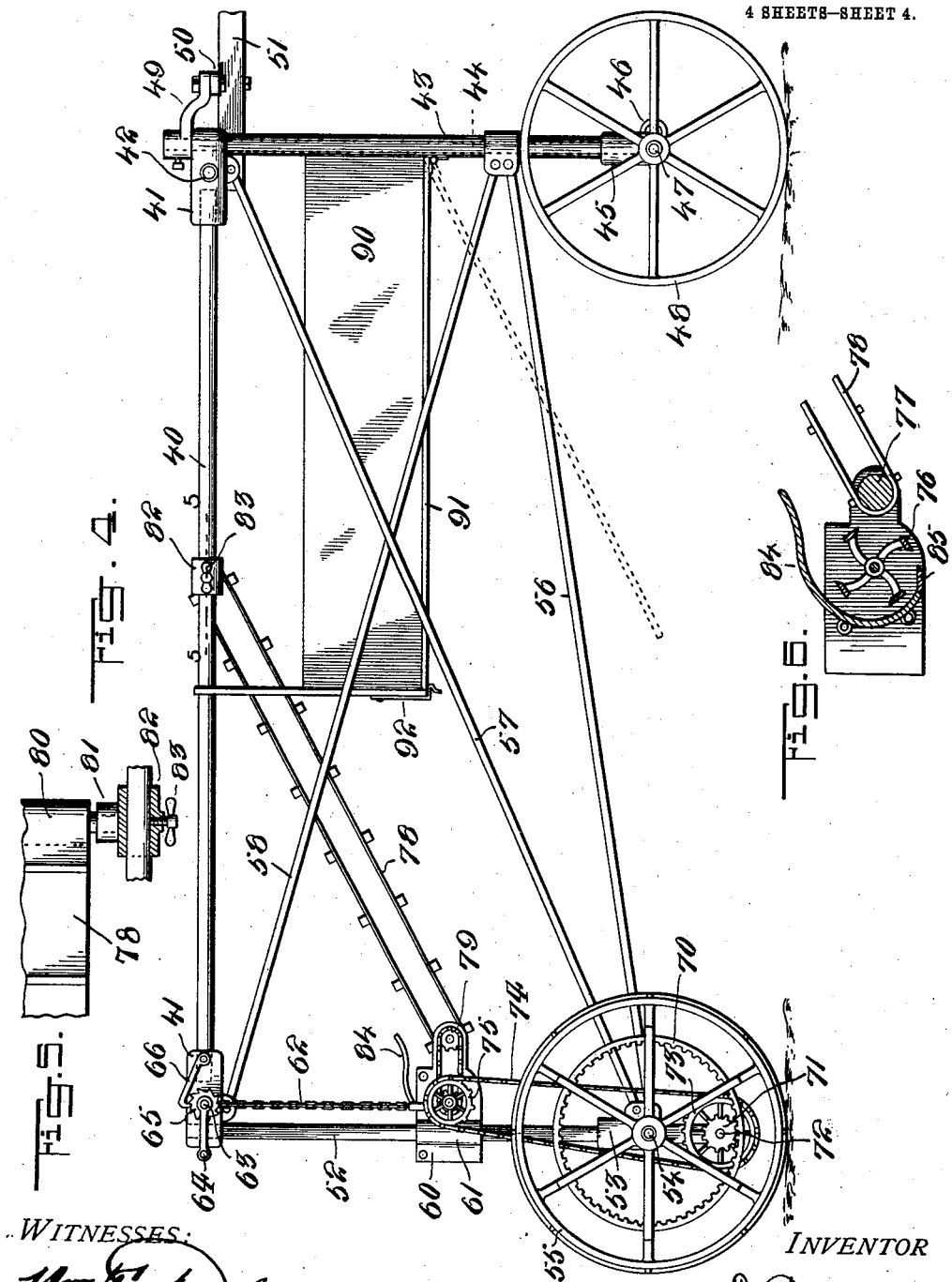

HARRY T. COLDWELL, OF NEWBURGH, NEW YORK.

TEA-HARVESTER.

1,024,499.      Specification of Letters Patent.      Patented Apr. 30, 1912.

Application filed September 22, 1909, Serial No. 518,990. Renewed September 26, 1911. Serial No. 651,464.

*To all whom it may concern:*

Be it known that I, HARRY T. COLDWELL, citizen of the United States, residing at Newburgh, in the county of Orange and State of New York, have invented certain new and useful Improvements in Tea-Harvesters; and I do hereby declare the following to be a full, clear, and exact description of the invention, such as will enable others skilled in the art to which it appertains to make and use the same.

My invention is an improvement in tea harvesting machines and consists in the novel features hereinafter described reference being had to the accompanying drawings, which illustrate two forms in which I have contemplated embodying my invention and said invention is fully disclosed in the following description and claims.

Referring to the said drawings, Figure 1 represents a side elevation of a two wheeled machine for harvesting tea embodying my invention. Fig. 2 is a top plan view of the same. Fig. 3 is a vertical transverse section of Fig. 1 on line 3—3 looking in the direction of the arrow. Fig. 4 is a side elevation of a four wheeled machine for harvesting tea embodying my invention. Fig. 5 is a detail section on line 5—5 of Fig. 4. Fig. 6 is a detail vertical section of the cutting mechanism, showing the deflector or shield.

The object of my invention is to provide a machine by means of which the several successive cuttings required may be made and the product harvested in separate portions, in the same manner as when the cutting is performed by hand.

In the machine illustrated in Figs. 1, 2 and 3, 1 represents the main frame of the machine which is in the form of an inverted U provided at its lower end with stub axles 2, 2 carrying supporting and driving wheels 3, 3, spaced a sufficient distance apart to straddle a row of the tea bushes. The frame 1 is provided with suitable draft appliances so that it can be drawn by draft animals or otherwise through the field. In this instance the frame is shown as provided with a double tongue 4, 4, connected to the stub axles below the same, and provided with brace bars 5, 5, extending to the top of the frame 1. Brace bars 6, 6, extend from the lateral extensions 7, 7 of the divided tongue to the outer ends of the axles, and braces 8, 8 extend from each of said lateral extensions to the inner part of the adjacent tongue piece 4. The outer ends of the tongue pieces 4, 4 are connected by braces 9, 10 and the extensions 7 are provided with whiffletrees 11 to which the draft animals may be attached. I do not limit myself to any particular form of draft apparatus, however, as the same may be varied in many ways. Upon the vertical members of the frame 1, is mounted a vertically movable cutting mechanism, comprising side plates 12, 12, provided with vertical guides or ways 13, adapted to slide vertically on the main frame bars, said side plates being connected by suitable cross bars and provided with a stationary knife and rotary cutter or wiper. Mechanism is provided for supporting the frame of the cutting mechanism at different distances from the ground, such means consisting in this instance of a winding shaft 14, mounted in bearings on the top of the main frame 1, and provided with chains (or other flexible connections 15, 15) extending therefrom to the side frames of the cutting mechanism. The winding shaft is provided with a crank 14$^a$ preferably at each end, and with a ratchet and pawl mechanism. In this instance I have shown the shaft 14 provided with a ratchet wheel 16 at each side of the machine which is engaged by a pawl 17, held in engagement with the ratchet wheel by a spring 18. By this means the cutting mechanism can be supported at any desired height from the ground. Suitable mechanism is also provided for driving the cutting mechanism. In this instance I have shown one of the supporting wheels provided with an annulus 20, which engages a pinion 21 on a stud 22, secured to the main frame, said pinion being connected with a sprocket wheel 23, connected by a chain 24 with a sprocket wheel 25 on the shaft of the rotary cutter. The chain 24 is made up of links detachably connected together, and when the cutting mechanism is adjusted vertically, the chain 24 is lengthened or shortened by inserting or removing links as required. Adjacent to the vertically movable cutting mechanism is a receptacle for receiving the severed leaves as they are cut. This consists in this instance of a frame 26 having its forward end connected to the frame of the cutting mechanism, as indicated at 27 and provided with a bottom 26$^a$ of thin pervious material. In order to maintain the frame 26 in horizontal position, the side bars thereof are provided adjacent to the cutter frame with vertically disposed guide rods, 28, 28 which have a sliding engagement with guides (or eye bolts) 29, 29 secured to the main frame 1, and to further support the frame 26, and prevent undue jolting of the same, I provide the outer ends with flexible connections 30, 30 (light chains being herein shown) which are adjustably secured to catches 31, in this instance in the form of hooks over which any link of the chains can be secured to give the desired support to the frame 26. The frame 26 is provided with side pieces 32, 32 of canvas or other suitable material to prevent the severed leaves from being jolted off of the bottom. When these side pieces are made of flexible material they are conveniently held in vertical position by cords or tapes which are secured to the guides 29 or other part connected with the main frame. In using this form of tea harvester, the machine is made to straddle a row of the plants or bushes. which have been pruned to a uniform height, and from which it is desired to harvest the new leaves, and is drawn along the row of plants thereby actuating the cutting mechanism. In making the first cut, the cutting mechanism is adjusted so as to sever the topmost leaves, which are thrown backward upon the leaf receiving device, and are thus gathered separately. The cutting mechanism is then lowered the desired distance for the next cut, and again drawn through the field, harvesting the second cut separately, and the succeeding cut or cuts is or are made after further adjusting the cutting mechanism downwardly.

In Figs. 4, 5 and 6 I have shown a machine provided with four wheels embodying my invention. In these figures the main frame comprises a rectangular top frame, including the lateral bars 40, 40 preferably tubular, and fitting into corner castings 41, 41 to which they are rigidly secured in any desired manner. The castings 41 are connected by transverse bars 42 making a rectangular frame. From each of the front castings 41, there depends a tubular vertically disposed bar 43 and through each of these hollow bars extends a solid vertical steering shaft 44, provided at its lower end with a casting 45, having a draft connection 46 on its forward side, and a laterally extending axle 47 carrying one of the front or steering wheels 48. Each of the vertical shafts 44 is provided at its upper end with a forwardly extending steering arm 49, pivotally connected with a link 50, connected with the tongue 51, said tongue being pivotally connected with the front bar 42 of the top frame. In this manner the lateral movements of the tongue will operate the steering arms, and shafts and the front or steering wheels of the machine. At the rear end of the top frame the castings 41 are provided with vertical bars 52 (preferably solid) and carrying at their lower ends castings 53, to which the stub axles 54 are secured, said axles carrying the rear wheels 55. Brace bars 56 connect the front and rear vertical bars 43 and 52 and diagonal brace bars 57, 58 further stiffen the frame of the machine. Suitable transversely extending brace bars may also be employed where desired or found necessary. The resulting frame is light and strong and will straddle the rows of bushes when drawn through the field. Upon the rear vertical frame bars 52, 52 I mount the vertically movable cutting mechanism, the side frames 60 of which are provided with guides 61 engaging said bars. 62, 62 represent chains connected to the said side frames, and connected at their upper ends to the winding shaft 63, which extends through the rear transverse hollow frame bar 42, and is provided with a crank 64, ratchet wheel 65 and pawl 66, as shown. By this means the cutting mechanism can be raised or lowered as required. One of the rear wheels 55, is shown provided with an annulus 70 gearing with a pinion 71, on a shaft 72 carried on the lower end of one of the bars 52 which is extended downwardly for the purpose and said pinion is secured to a sprocket chain 74 formed of detachable links, which passes over a sprocket wheel 75 on the cutting mechanism, for driving the rotary cutter 76. The side frames of the cutting mechanism are provided with forward extensions carrying a roller 77 for supporting one end of a conveyer 78, said roller being driven from the cutter driving mechanism by means of a chain 79 and sprocket wheels as shown. The upper end of the conveyer 78 is carried by a roller 80 the shaft of which is mounted in bearings 81 in sleeves 82, having a sliding engagement with the longitudinal frame bars 70, and being adjustably secured thereto by set screws 83 or other means. When the cutting mechanism is raised or lowered the bearing sleeves 82 will be adjusted to secure the proper tension of the conveyer 78. In order to cause the rotary cutter to deliver the severed leaves upon the conveyer I provide a curved shield or deflector 84, extending from the rear of the stationary knife 85, around the rotary cutter, as shown best in Fig. 6. The conveyer 78 delivers the severed leaves into a suitable receptacle carried by the machine which may be secured thereto or removable as desired. In this instance I have shown a receptacle 90 supported in the machine below the upper end of the conveyer. I prefer to have the bottom 91 of the receptacle hinged at the front end, and the rear end may be secured by a spring catch 92 (or catches) as shown, so that by releasing such catches the bottom may be dropped into the position shown in dotted lines Fig. 4, to facilitate the removal of the severed leaves.

The operation of the machine shown in Figs. 4, 5 and 6 is substantially the same as that previously described, except that the severed leaves will be thrown by the revolving cutter and shield upon the conveyer 78 and by it carried upward and delivered into the receptacle 90 from which they may be removed from time to time.

What I claim and desire to secure by Letters Patent is:—

1. In a tea harvesting machine, the combination with the main frame, having an elevated horizontally disposed portion, and separated vertical portions depending therefrom, and supporting wheels secured to the said vertical portions, of cutting mechanism carried by the main frame and comprising a stationary knife and a rotary cutter, means for holding said knife and cutter at all times in operative relation to each other, means for vertically adjusting said cutting mechanism bodily with respect to the main frame, driving connections extending from the rotary cutter to a supporting wheel, and a leaf receptacle carried by the main frame, for receiving the severed portions of the leaves from the rotary cutter.

2. In a tea harvesting machine, the combination with the main frame having an elevated horizontal portion and separated vertical portions depending therefrom, of supporting wheels secured to said depending portions, a horizontally disposed cutter frame having a vertical sliding engagement with the vertical portions of the main frame, a stationary knife and a rotary cutter carried by the cutter frame, operative mechanism for driving the rotary cutter, mechanism for simultaneously adjusting the opposite ends of said cutter frame vertically with respect to the main frame, and a leaf receiving device for receiving the severed portions of the plants from the rotary cutter.

3. In a tea harvesting machine, the combination with the main frame, having an elevated horizontal portion and separated vertical portions depending therefrom, of supporting wheels secured to said depending portions, a horizontally disposed cutter frame having a vertical sliding engagement with the vertical portions of the main frame, a stationary knife and a rotary cutter carried by the cutter frame, operative mechanism for driving the rotary cutter, mechanism for simultaneously adjusting the opposite ends of said cutter frame vertically with respect to the main frame, a leaf receiving device for receiving the severed portions of the plants from the rotary cutter, having one end adjacent to the cutter, and means for vertically adjusting said leaf receiving device, with respect to the main frame to accommodate it to the adjustments of the cutter frame.

4. In a tea harvesting machine, the combination with the main frame, having an elevated horizontal portion and separated vertical portions depending therefrom, of supporting wheels secured to said vertical portions, a horizontally disposed cutter frame having a vertically sliding engagement with the vertical portions of the main frame, an adjustable mechanism secured to the main frame, and operatively connected to each end of the cutter frame for adjustably supporting the cutter frame at different elevations with respect to the main frame, a stationary knife and a rotary cutter mounted in the cutter frame, adjustable driving connections between the cutter bar and a supporting wheel of the main frame, and a horizontally disposed leaf receiving device supported by the main frame and having one end adjacent to the rotary cutter.

5. In a tea harvesting machine, the combination with the main frame, having an elevated horizontal portion and separated vertical portions depending therefrom, of supporting wheels secured to said vertical portions, a horizontally disposed cutter frame having a vertically sliding engagement with the vertical portions of the main frame, a stationary knife and a rotary cutter mounted in the cutter frame, devices connected to opposite ends of said cutter frame for positively and simultaneously lifting both ends of the frame, means for maintaining said frame in its vertically adjusted positions, driving mechanism for the rotary cutter, and a leaf receiving device.

6. In a tea harvesting machine, the combination with the main frame, having an elevated horizontal portion and separated vertical portions depending therefrom, of supporting wheels secured to said vertical portions, a horizontally disposed cutter frame having a vertically sliding engagement with the vertical portions of the main frame, a stationary knife and a rotary cutter mounted in the cutter frame, a winding shaft secured to the main frame, flexible connections extending from said shaft to the ends of said cutter frame, locking mechanism for said winding shaft for holding the cutter frame in its adjusted positions, driving mechanism for the rotary cutter and a leaf receiving device.

7. In a tea harvesting machine, the combination with the main frame, having an elevated horizontal portion and separated vertical portions depending therefrom, of supporting wheels secured to said vertical portions, a horizontally disposed cutter frame having a vertically sliding engagement with the vertical portions of the main frame, a stationary knife and a rotary cutter mounted in the cutter frame, means for simultaneously adjusting both ends of the cutter frame vertically with respect to the main frame, driving mechanism for the rotary cutter, and a horizontally disposed leaf receiving device having one end secured to and movable vertically with the cutter frame, and adjustable means for supporting the other end of the leaf receiving device from the main frame.

8. In a tea harvester, the combination with a main frame, having elevated horizontally disposed portions, and separated vertically disposed portions depending therefrom, of supporting wheels connected to said vertical portions of the main frame, a cutter frame movable vertically with respect to the main frame, and having a sliding engagement with vertical portions of the main frame, a stationary knife and a rotary cutter mounted in the cutter frame, independently of the main frame, driving mechanism for the rotary cutter, means for simultaneously adjusting both ends of the cutter frame vertically with respect to the main frame, a leaf receiving device carried by the main frame, and an endless conveyer connected to the cutter frame at one end, and having its other end supported in position to deliver the cut portions of the leaves to the said receptacle.

9. In a tea harvester, the combination with a main frame, having elevated horizontally disposed portions and separated vertically disposed portions depending therefrom, of supporting wheels connected to said vertical portions of the main frame, a cutter frame movable vertically with respect to the main frame, and having a sliding engagement with vertical portions of the main frame, a stationary knife and a rotary cutter mounted in the cutter frame, independently of the main frame, driving mechanism for the rotary cutter, means for simultaneously adjusting both ends of the cutter frame vertically with respect to the main frame, a leaf receptacle supported by the main frame, an endless conveyer extending from the cutter frame to said receptacle and having one end connected to the cutter frame, and means for adjusting the other end of the conveyer with respect to the main frame to accommodate for the vertical adjustments of the cutter frame.

10. In a tea harvester, the combination with a main frame, having elevated horizontally disposed portions, and separated vertically disposed portions depending therefrom, of supporting wheels connected to said vertical portions of the main frame, a cutter frame movable vertically with respect to the main frame, and having a sliding engagement with vertical portions of the main frame, a stationary knife and a rotary cutter mounted in the cutter frame, independently of the main frame, driving mechanism for the rotary cutter, means for simultaneously adjusting both ends of the cutter frame vertically with respect to the main frame, a leaf receptacle supported by the main frame, an endless conveyer extending from the cutter frame to said receptacle, and having its lower end secured to the cutter frame and the upper end supported by horizontal portions of the main frame, and means for adjusting the upper end of the conveyer horizontally with respect to the main frame to accommodate the vertical adjustments of the cutter frame.

In testimony whereof I affix my signature, in the presence of two witnesses.

HARRY T. COLDWELL.

Witnesses:
EDWIN T. SMITH,
MYRON S. EMBLER.